US008090488B2

(12) United States Patent
Agrawal et al.

(10) Patent No.: US 8,090,488 B2

(45) Date of Patent: Jan. 3, 2012

(54) INTELLIGENT POWERED MOBILITY FOR INFANTS AND SPECIAL NEEDS CHILDREN

(76) Inventors: Sunil K. Agrawal, Newark, DE (US); James C. Galloway, Elkton, MD (US); Ji-Chul Ryu, Newark, DE (US)

( * ) Notice: Subject to any disclaimer, the term of this patent is extended or adjusted under 35 U.S.C. 154(b) by 556 days.

(21) Appl. No.: 12/245,169

(22) Filed: Oct. 3, 2008

(65) Prior Publication Data

US 2009/0132124 A1 May 21, 2009

Related U.S. Application Data

(60) Provisional application No. 60/977,297, filed on Oct. 3, 2007.

(51) Int. Cl.
*G01C 22/00* (2006.01)

(52) U.S. Cl. ........................................................ 701/23

(58) Field of Classification Search .................... 701/25, 701/26, 28, 207, 301, 23; 280/250.1; 180/65.1, 180/65.5
See application file for complete search history.

(56) References Cited

U.S. PATENT DOCUMENTS

| | | | | |
|---|---|---|---|---|
| 5,592,997 | A * | 1/1997 | Ball | 180/65.1 |
| 5,701,968 | A * | 12/1997 | Wright-Ott et al. | 180/65.1 |
| 6,154,690 | A * | 11/2000 | Coleman | 701/1 |
| 6,771,034 | B2 | 8/2004 | Reile et al. | |
| 2004/0267442 | A1 | 12/2004 | Fehr et al. | |
| 2005/0183900 | A1 * | 8/2005 | Goertzen et al. | 180/311 |
| 2006/0011393 | A1 | 1/2006 | Bergum et al. | |
| 2009/0121532 | A1 * | 5/2009 | Kruse et al. | 297/330 |

OTHER PUBLICATIONS

International Search Report for International Application No. PCT/US08/78726 mailed Dec. 5, 2008.
Written Opinion of the International Searching Authority for International Application No. PCT/US08/78726 mailed Dec. 5, 2008.

* cited by examiner

*Primary Examiner* — Faye M. Fleming
(74) *Attorney, Agent, or Firm* — RatnerPrestia

(57) ABSTRACT

A powered mobility device for advancing cognitive, perceptual and motor abilities of a child lacking natural mobility is disclosed. The device includes a seat sized for the child to be secured therein and a motorized drive assembly coupled to the seat. A local operating instrument is operably coupled to the drive assembly for operating and steering the drive assembly. The local operating instrument is positioned to allow manipulation by the child seated in the seat. A processor is operatively coupled to the motorized drive assembly and to a local steering instrument. The processor is adapted to transmit a signal to the motorized drive assembly and the local steering instrument to control the mobility device. A method for advancing cognitive, perceptual and motor abilities of a child by using the device is also disclosed.

18 Claims, 1 Drawing Sheet

INTELLIGENT POWERED MOBILITY FOR INFANTS AND SPECIAL NEEDS CHILDREN

CROSS REFERENCE TO RELATED APPLICATIONS

This application claims priority from U.S. Provisional Patent Application Ser. No. 60/977,297, filed on Oct. 3, 2007, which is incorporated herein by reference in its entirety.

STATEMENT REGARDING FEDERALLY SPONSORED RESEARCH

The U.S. Government has a paid-up license in this invention and the right in limited circumstances to require the patent owner to license others on reasonable terms as provided for by the terms of NSF Grant # BCS-0745833, awarded by the National Science Foundation.

BACKGROUND OF THE INVENTION

Self-generated mobility via locomotion is a key for the cognitive, social and motor development of young infants and certain children with special needs. Exploration of the world is one key to the rapid, significant advancement in cognitive, perceptual and motor abilities characteristic of early infancy. Two categories of skills provide the vehicle for physical exploration. The first to emerge is the ability to independently explore the local environment through reaching and grasping. The second is the ability to independently explore distant environments through locomotion.

Over the first 8 months of postnatal life, typically developing infants gain the ability to reach for and grasp objects within their local environment. Such local exploration has been associated with rapid advances in social, cognitive, perceptual, and motor development. Exploration of the world by infants this age ultimately becomes limited by their inability to independently travel over distances. Consequently, these infants spend most of their time sitting and exploring the local environment that is within reach. For further exploration, caregivers must bring objects or playmates to them, or vice versa.

Consequently, there exists a need for a device that provides the ability for such children to independently explore their world.

SUMMARY OF THE INVENTION

Briefly, the present invention provides a powered mobility device for children. The device includes a seat sized for the child to be secured therein and a motorized drive assembly coupled to the seat. A local operating instrument is operably coupled to the drive assembly for operating and steering the drive assembly. The local operating instrument is positioned to allow manipulation by the child seated in the seat. A processor is operatively coupled to the motorized drive assembly and to a local steering instrument. The processor is adapted to transmit a signal to the motorized drive assembly and the local steering instrument to control the mobility device.

The present invention further provides a method for advancing cognitive, perceptual and motor abilities of a child. The method comprises the steps of placing the child in the seat of the device described above; encouraging the child to touch the local operating instrument; and allowing the child to drive the device through operation of the local operating instrument.

Further, the present invention provides a powered mobility device for children with limited personal mobility. The device comprises robotic drive assembly having a seat and a local operating instrument coupled to the robotic drive assembly to operate and steer the drive assembly. The local operating instrument is operable by a child seated in the seat. A plurality of sensors coupled to the robotic drive assembly and to the seat. The robotic drive assembly is programmable to respond to input from the plurality of sensors to change direction of the mobility device. The local operating instrument is programmable to move in response to the input.

BRIEF DESCRIPTION OF THE DRAWINGS

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the disclosure without departing from the invention.

Referring to the figures in general, a powered mobility device 100 according to an exemplary embodiment of the present invention is shown. Device 100 is a vehicle that allows infants and children with developmental disabilities to operate on their own in order to maneuver from one location to another. The child is seated in a seat and allowed to maneuver device 100 through a single action.

Figure 1:
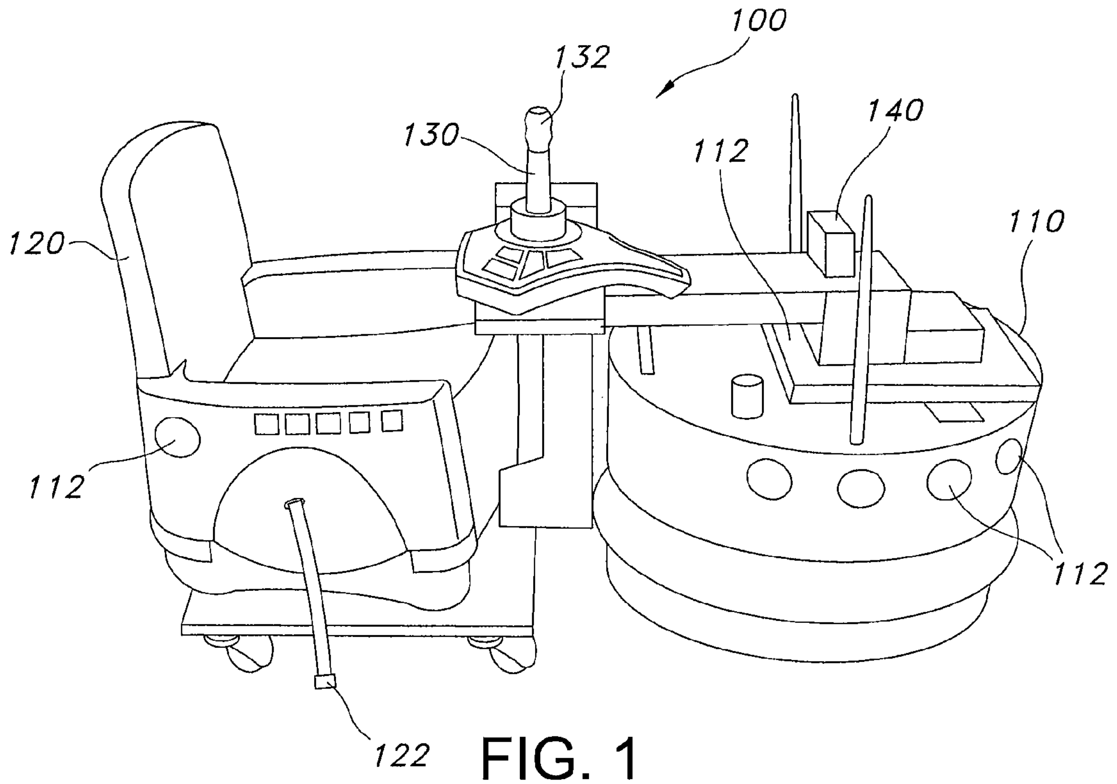
FIG. 1 is a side perspective view of a powered mobility device according to a first exemplary embodiment of the present invention.

Referring specifically to FIG. 1, device 100 includes a drive assembly 110, such as, for example, the Magellan Pro robot, manufactured by iRobot of Bedford, Mass. Drive assembly 110 is maneuverable about 360 degrees, with a zero turning radius. Drive assembly 110 may be operated by a battery (not shown) that allows device 100 to operate without the encumbrance of a power cord.

A seat 120 may be coupled to drive assembly 110. Seat 120 may be sized to allow a user, such as an infant or small child, to be seated thereon. While drive assembly 110 and seat 120 are illustrated as discrete units that are coupled to each other, those skilled in the art will recognize that drive assembly 110 and seat 120 may be an integrated unit.

One or more straps 122 (only one strap 122 shown in FIG. 1) are fixed to seat 120 and may be used to secure the user in seat 120. In an exemplary embodiment, seat 120, along with drive assembly 110, is sized for use with an infant or small child. Further, seat 120 may be coupled to drive assembly 110 such that drive assembly 110 is located in front of seat 120.

This arrangement places drive assembly 110 in front of the user when the user is traveling in a forward direction.

A local operating instrument, such as, for example, a joystick 130, is operably coupled to drive assembly 110 to operate and steer drive assembly 110. Joystick 130 is located on device 100 such that joystick 130 is operable by a user 50 (shown in FIG. 2) seated in seat 120. In the exemplary embodiment shown in FIG. 1, joystick 130 is mounted to the top of drive assembly 110. A diversionary device, such as a toy 132, may be coupled to joystick 130 to attract the attention of the user and to encourage the user to operate joystick 130.

Joystick 130 is operable to maneuver device 100 forward and backward by pushing joystick 130 forward and pulling joystick 130 backward, respectively. In an exemplary embodiment, maximum speed in either forward or reverse direction is 0.2 meters per second. Operation of joystick 130 in either the right or left direction rotates device 100 to either the right or the left, respectively. In an exemplary embodiment, maximum rotation to either the right or the left is 14.3 degrees per second. With joystick 130 in a neutral position, device 100 does not move. Joystick 130 may be hard wired to drive assembly 110 or alternatively, drive assembly 110 may be controlled by joystick 130 through radio frequency.

Drive assembly 110 and/or seat 120 may optionally include a plurality of sensors 112 disposed therearound. In an exemplary embodiment, sixteen sensors 112 may be spaced around drive assembly 110 and/or seat 120. Sensors 112 may be infrared and/or sonar sensors that are able to sense an obstacle (not shown) in the path of device 100. Device 100 may be programmable to respond to input from at least one of sensors 112 to steer away from the obstacle or to stop.

Device 100 may also be programmable to transmit a signal to joystick 130 to manipulate joystick 130 toward a direction commensurate with the direction in which device 100 moves to steer away from the obstacle. Such manipulation of joystick 130 may provide a suggestion to the user that the user should manipulate joystick 130 in that direction in order to steer away from the obstacle. This manipulation is intended to correlate movement of joystick 130 with the directional change of device 100 to teach the user that the operation of joystick 130 influences the direction of motion of device 100. The user, however, may urge joystick 130 in a different direction and override the suggestion provided by joystick 130.

A visual recording instrument 140, such as a video or still camera, may be coupled to device 100 and positioned to record facial expressions of the user in seat 120 as the user operates device 100. Viewing the facial expressions of the user may provide insight into cognitive awareness and perceptions of the user as the user operates device 100 and views his/her changing environment as device 100 moves. In an exemplary embodiment, recording instrument 140 may be mounted forward of joystick 130 so that the user cannot reach recording instrument 130.

Figure 2:
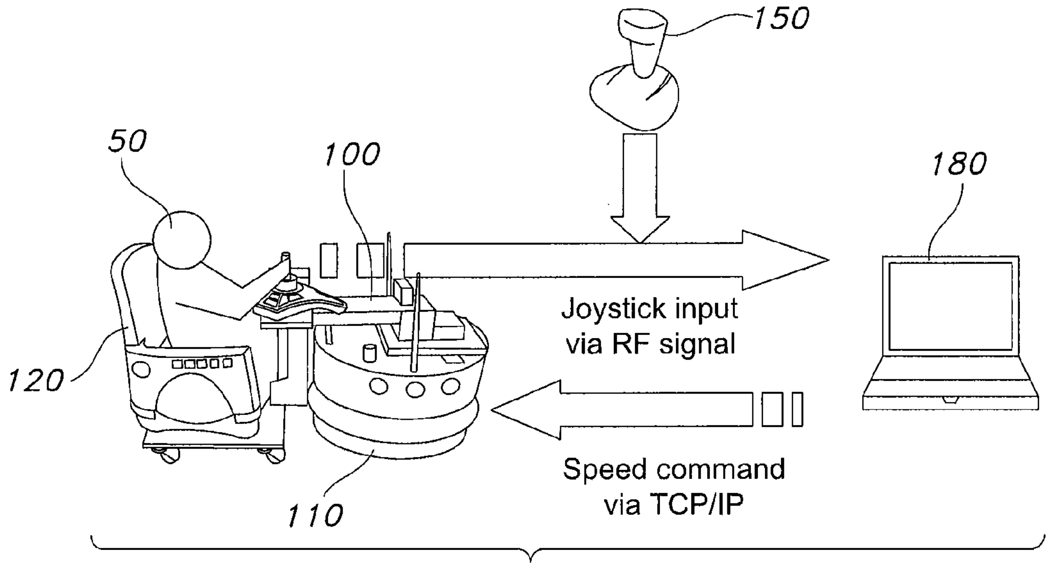
FIG. 2 is a schematic view of an embodiment of an operational protocol for the powered mobility device illustrated in FIG. 1

Referring now to FIG. 2, in an exemplary embodiment, a remotely operated steering instrument 150 is in operative communication with drive assembly 110. Remotely operated steering instrument 150 is programmed to override signals transmitted to drive assembly 110 by joystick 130. An additional party, such as, for example, a caregiver (not shown), may use remotely operated steering instrument 150 to steer device 100 in a direction and/or to a location where the caregiver desires the user to travel.

While device 100 may be used to allow a user to autonomously maneuver around, device 100 may also be used to obtain learning data from the user as the user operates device 100. In this regard, a recording device 180, such as, for is example, a notebook computer, may optionally be used in conjunction with device 100 to record the user's operation of device 100. Displacement of joystick 130 may transmit radio frequency signals to recording device 180, which both records the joystick transmitted signals and transmits an operating signal to device 100. Additionally, recording device 180 may record the movement of device 100 relative to a starting point, as well as record signals transmitted by at least one of sensors 112 and the movement of device 100 in response to the input of sensors 112.

While recording device 180 is illustrated in FIG. 2 as being separate from device 100, those skilled in the art will recognize that recording device 180 may be integrated with device 100, such as, for example, inside drive assembly 110.

EXAMPLES

Device 100 was operated by two different users to confirm their ability to operate device 100 as well as to obtain data to determine their learning curves. The results of these operations are discussed in Galloway et al., "Babies driving robots: Self-generated mobility in very young infants," Journal of Intelligent Service Robotics, Special Issue of "Multidisciplinary Collaboration for Socially Active Assistive Robotics" vol. 1, no. 2, pp. 123-134, April 2008, which is incorporated by reference herein in its entirety.

Example 1

Elijah (Typically Developing 7 Month Old)

This infant typically engaged joystick 130 with both hands and often with his mouth as well. While driving during initial sessions, Elijah was typically flexed forward over joystick 130 and looked at the walls, floor, objects and people as he passed primarily by moving his eyes. A preliminary review of videotape of his sessions suggested that, qualitatively, he did not typically turn his head or trunk while driving, and maintained a neutral facial expression. By the last sessions, Elijah sat more upright, and contacted joystick 130 less with his mouth. He rarely altered his course throughout a session. That is, if he started driving in a circle or straight at the beginning of a session, he continued to drive that path until coming to a barrier or obstacle from which an experimenter would use remotely operated steering instrument 150 to turn device 100. He would then resume a circle or straight path, and continue so until reaching another barrier or obstacle.

Data and conclusions developed during the course of Elijah's use of device 100 are as follows:

1. Total session time: 147-416 seconds in the first three sessions (average 294 seconds) to 715-948 seconds during the last four sessions (average 819 seconds). This was a 170% increase in total session time.
2. Percent of total session time spent driving: 17-30% in the first three sessions (average 25%) to 47-64% seconds during the last four sessions (average 55%). This was a 125% increase in the percent total session time spent driving. In absolute time spent driving, the increase was from an average of 74 seconds during the first three sessions to 451 seconds during the last four sessions.
3. Total path length: 1-15 meters in the first three sessions (average 9 meters) to 37-74 meters in the last four sessions (average 58 meters). This was a 547% increase in the total path length.
4. Number of joystick activations: 4-32 activations in the first three sessions (average 20) to 18-79 activations during the last four sessions (average 46). This was a 132% increase the number of joystick activations.

5. Average duration of joystick activations: 3-24 seconds in the first three sessions (average 11) to 5-25 seconds activations during the last four sessions (average 14). This was a 28% increase in the average duration of activations.
6. There was a linear relationship between the percent driving time and total session time ($R^2$=0.8). That is, the longer the session time the greater the percent of that time that was spent driving.

Example 2

Jackson (14 Month Old Diagnosed with Downs Syndrome)

In comparison to Elijah, this infant typically engaged the joystick with one hand and rarely with his mouth. A preliminary review of the videotape of his sessions suggested that, while driving, Jackson sat upright and activated the joystick while turning his head and trunk to look at passing walls, floor, objects and people. He also altered his path several times a session such that a session's path contained straight segments and circles. Jackson also smiled and laughed while driving.

Data and conclusions developed during the course of Jackson's use of device 100 are as follows:

1. Total session time: 322-560 seconds in the first three sessions (average 464 seconds) to 709-1033 seconds during the last three sessions (average 853 seconds). This was a 80% increase in total session time.
2. Percent of total session time spent driving: 23-45% in the first three sessions (average 36%) to 37-54% seconds during the last three sessions (average 47%). This was a 30% increase in the percent total session time spent driving. In absolute time spent driving, the increase was from an average of 167 seconds during the first three sessions to 401 seconds during the last three sessions.
3. Total path length: 10-35 meters in the first three sessions (average 25 meters) to 41-73 meters in the last three sessions (average 60 meters). This was a 141% increase in the total path length.
4. Number of joystick activations: 31-33 activations in the first three sessions (average 31) to 22-73 activations during the last three sessions (average 53). This was a 73% increase the number of joystick activations.
5. Average duration of joystick activations: 2-8 seconds in the first three sessions (average 6) to 7-12 seconds activations during the last three sessions (average 9). This was a 49% increase in the average duration of activations.
6. There was a linear relationship between the percent driving time and total session time ($R^2$=0.70). That is, the longer the session time, the greater the percent of that time that was spent driving.
7. During operation of device 100 during one of the sessions, an instructor used remotely operated steering instrument 150 on two occasions to redirect movement of device 100.

The two infants that were seen for multiple sessions displayed the opportunistic exploration that characterizes young infants. During the first session, both infants independently grasped and moved joystick 130 within minutes of being placed into seat 120, and continued to move device 100 for many minutes over many meters of motion. Over multiple sessions, both children increased their total session time, reflecting their ability to tolerate sitting in and moving device 100 at least once each 5 minutes up to a maximum of a 20 minute session. These infants increased their tolerance from 5 to 8 minutes on average over the first three sessions to 14 minutes on average over the last three sessions. Data recorded during their driving reveals they did not simply produce the minimum joystick activations, but rather produced a relatively high level of joystick activity. By the last session, both infants were driving more than 50% of the time they were in device 100, which was double their starting percentage and resulted in approximately 8 minutes of active driving time. This level of activity is important to be able to train young infants to accomplish tasks by driving to specific locations or around obstacles, which will require sustained periods of active problem solving. Learning experiments in which infants are involved in problem solving suggest that actively moving device 100 for 10-15 minutes or more will provide a baseline of activity from which infants can learn to associate joystick motion with mobile robot motion.

Both infants drove for longer path lengths over sessions; however each did so with a different pattern. Path length increased abruptly on session 4 for Elijah, whereas path length gradually increased over each session for Jackson. Each infant also displayed a different manner by which they increased the path length over the last three sessions. Elijah increased path length by increasing the duration joystick activations while decreasing the number of activations, whereas Jackson increased path length by increasing the number of joystick activations. Such individualized changes are also a common feature of learning and development in infancy.

These results demonstrate that young infants will independently move themselves via a mobile device, such as device 100. The data do provide indirect evidence that infants were not simply focused on moving joystick 130 but were associating joystick activation with their motion. First, infants did not habituate to joystick 130. It is well known that infants will decrease their responsiveness with repeated presentations of the same situation or task. Joystick 130 used in the above study was not colorful or particularly interesting compared to the toys these infants spent their days with in their classrooms and at home. Thus, if the infants were focused solely on joystick 130, it may be theorized that their responsiveness would have decreased over time within a session and between sessions. In contrast, their joystick activations increased in number and/or duration resulting in increased driving time and path length.

For both of these infants, device 100 provided the first experiences of self generated mobility over long distances. Elijah, as a typically developing infant, is will likely begin to walk around 12 months of age. Jackson, however, has a diagnosis of Down Syndrome. Children with Down Syndrome often have delays in attaining the major developmental milestones such a walking and speaking. Many also have mild to moderate cognitive impairments. At 14 months, Jackson was not yet pulling to stand and thus was at risk for delays in walking. Interestingly, other infants Jackson's age explored the various components of device 100, but did not drive. Thus, Jackson performed as a somewhat younger infant in device 100, which probably was related to his somewhat lower cognitive and motor abilities at the time of testing.

While the results described above do not provide direct evidence that these infants were purposefully driving to specific locations, the protocol for this study was designed to gather data for future studies involving training, and was not structured to formally quantify learning, memory or purposeful actions. It is theorized, however, that the motion of device 100 was reinforcing to joystick movement. That is, infants were rewarded for joystick motion with self motion.

It is theorized that even very young infants are able to associate body movement with motion in the environment, and remember this association for many days. In an exemplary method of testing this theory, infants are allowed to interact with a non active joystick (baseline condition), then an active joystick resulting in self motion (acquisition condition), then a non active joystick (extinction condition). If infants associate joystick motion with self motion, joystick activations during extinction should be greater than those during baseline. Moreover, memory is shown by comparing baseline levels on Day 1 with baseline levels of subsequent days. Such associative learning is a critical step in the development of purposeful behaviors. The next step in the exemplary method may include showing that infants prefer to activate a joystick that results in self motion. This exemplary embodiment includes combining the training of young infants, both typically developing and those with mobility impairments, with mobile robotics technology to allow infants the ability to display increasingly complex self generated mobility. Thus, complex mobility is the primary outcome with the advancement of general development being an expected result of increased mobility. One area of application of mobile robot technology is in the area of power mobility for infants and children with special needs.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A powered mobility device for advancing cognitive, perceptual and motor abilities of a child lacking natural mobility, the device comprising:
- a seat sized for the child to be secured therein;
- a motorized drive assembly coupled to the seat;
- a local operating instrument operably coupled to the drive assembly for operating and steering the drive assembly, the local operating instrument positioned to allow manipulation by the child seated in the seat;
- a processor operatively coupled to the motorized drive assembly and to a local steering instrument, wherein the processor is adapted to transmit a signal to the motorized drive assembly and the local steering instrument to control the mobility device; and
- a remotely operated steering instrument in operative communication with the drive assembly, wherein the remotely operated steering instrument is programmed to override signals transmitted to the drive assembly by the local operating instrument.

2. The powered mobility device according to claim 1, further comprising at least one sensor mounted on the device for sensing an obstacle in the path of the device.

3. The powered mobility device according to claim 2, wherein the drive assembly is programmable to respond to input from the at least one sensor to either steer away from the obstacle or to stop.

4. The powered mobility device according to claim 3, wherein the processor transmits the signal to the local steering instrument based on the input from the at least one sensor.

5. The powered mobility device according to clam 1, wherein the local operating instrument further comprises a diversionary device coupled thereto.

6. The powered mobility device according to claim 1, further comprising a visual recording instrument coupled to the device and positioned to record facial expressions of a user in the seat.

7. The powered mobility device according to claim 1, further comprising a recording device to record signals transmitted to the motorized drive assembly.

8. The powered mobility device according to claim 7, wherein the recording device is separate from the motorized drive assembly.

9. The powered mobility device according to claim 1, wherein the seat and the motorized drive assembly are discrete units, in which the motorized drive assembly is coupled to a front portion of the seat.

10. The powered mobility device according to claim 1, wherein the local operating instrument is a joystick mounted to the drive assembly.

11. A method for advancing cognitive, perceptual and motor abilities of a child, the method comprising the steps of:

a) placing the child in a seat of a powered mobility device comprising:
- the seat, the seat being sized for the child to be secured therein;
- a motorized drive assembly coupled to the seat;
- a local operating instrument operably coupled to the drive assembly for operating and steering the drive assembly, the local operating instrument positioned to allow manipulation by the child seated in the seat;
- a processor operatively coupled to the motorized drive assembly and to a local steering instrument, wherein the processor is adapted to transmit a signal to the motorized drive assembly and the local steering instrument to control the mobility device; and
- a recording device to record signals transmitted to the motorized drive assembly;

b) encouraging the child to touch the local operating instrument;

c) allowing the child to drive the device through operation of the local operating instrument;

d) repeating steps (a)-(c) in multiple operating sessions; and e) recording data for the multiple operating sessions and tracking improvements in cognitive, perceptual and/or motor abilities of the child using the recorded data.

12. The method according to claim 11, further comprising the step of using a remotely-operated steering instrument to override signals transmitted by the local operating instrument to steer the device in a desired direction.

13. The method according to claim 11, further comprising the steps of: allowing the device to sense an obstacle; and automatically steering away from the obstacle or stopping the device.

14. The method according to claim 11, further comprising the step of transmitting a signal to the local operating instrument to manipulate the local operating instrument in a desired direction.

15. The method according to claim 11, wherein the child is an infant or a child with special needs.

16. A powered mobility device for children with limited personal mobility, the device comprising:
- a robotic drive assembly having a seat;
- a local operating instrument coupled to the robotic drive assembly to operate and steer the drive assembly, the local operating instrument being operable by a child seated in the seat;
- a plurality of sensors coupled to the robotic drive assembly and to the seat, wherein the robotic drive assembly is programmable to respond to input from the plurality of sensors to change direction of the mobility device and wherein the local operating instrument is programmable to move in response to the input; and a remotely operated steering instrument in operative communication with the drive assembly, wherein the remotely operated steering instrument is programmed to override signals transmitted to the drive assembly by the local operating instrument.

17. The powered mobility device according to claim 16, wherein the local operating instrument is adapted to be manipulated toward a direction commensurate with the change in the direction of the mobility device.

18. The powered mobility device according to claim 16, further comprising a processor adapted to receive a plurality of signals generated by the local operating instrument and the plurality of sensors and adapted to transmit an operating signal to the robotic drive assembly based on the plurality of signals.

* * * * *